United States Patent
Kohlenberg et al.

(10) Patent No.: US 9,817,403 B2
(45) Date of Patent: Nov. 14, 2017

(54) ENABLING DYNAMIC SENSOR DISCOVERY IN AUTONOMOUS DEVICES

(71) Applicant: Intel Corporation, Santa Clara, CA (US)

(72) Inventors: Tobias Kohlenberg, Portland, OR (US); Ravishankar R. Iyer, Hillsboro, OR (US); James Jin-koo Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,313

(22) Filed: Mar. 31, 2016

(65) Prior Publication Data

US 2017/0285656 A1    Oct. 5, 2017

(51) Int. Cl.
*G05D 1/02* (2006.01)

(52) U.S. Cl.
CPC .................. *G05D 1/0276* (2013.01)

(58) Field of Classification Search
CPC .... G05D 1/0276; G05D 1/0027; G05D 1/021; G05D 1/024; G05D 1/0223; G06N 3/004; G01C 1/00; B25J 11/009
USPC ........................ 701/23, 25, 70; 700/245, 246
See application file for complete search history.

(56) References Cited

U.S. PATENT DOCUMENTS

| | | | | |
|---|---|---|---|---|
| 8,374,721 B2 * | 2/2013 | Halloran | ................ | A47L 5/30 318/568.1 |
| 8,918,209 B2 * | 12/2014 | Rosenstein | ............ | B25J 11/009 700/245 |
| 2010/0063664 A1 | 3/2010 | Anderson | | |
| 2011/0125344 A1 | 5/2011 | An et al. | | |
| 2012/0083982 A1 * | 4/2012 | Bonefas | ................ | G05D 1/0223 701/70 |
| 2012/0239191 A1 * | 9/2012 | Versteeg | ................ | G06N 3/004 700/246 |
| 2012/0310466 A1 | 12/2012 | Fairfield et al. | | |
| 2013/0274986 A1 | 10/2013 | Trepagnier et al. | | |
| 2014/0136414 A1 * | 5/2014 | Abhyanker | ............ | G06Q 50/28 705/44 |

(Continued)

OTHER PUBLICATIONS

"International Application Serial No. PCT/US2017/019955, International Search Report dated May 24, 2017", 4 pgs.

(Continued)

*Primary Examiner* — McDieunel Marc
(74) *Attorney, Agent, or Firm* — Schwegman Lundberg & Woessner, P.A.

(57) ABSTRACT

Systems, apparatuses, and methods for enabling sensor discovery in autonomous devices herein. An example system for enabling dynamic sensor discovery including a client that includes an autonomous device. The autonomous device is capable of navigating from a current location to a destination location using sensor data. The client provides a request for sensor information for sensors along a planned route and receives respective sensor information for each of a set of selected sensors selected by a data server based on the request. The client subscribes to a data feed of a sensor of the set of selected sensors along the planned route based on sensor information corresponding to the sensor and client analyzes the data feed to determine whether to proceed with the planned route.

21 Claims, 5 Drawing Sheets

(56) References Cited

U.S. PATENT DOCUMENTS

| | | | |
|---|---|---|---|
| 2014/0180914 A1* | 6/2014 | Abhyanker | G01C 1/00 |
| | | | 705/39 |
| 2015/0202770 A1* | 7/2015 | Patron | G05D 1/024 |
| | | | 700/245 |
| 2015/0331422 A1* | 11/2015 | Hartung | G05D 1/021 |
| | | | 701/23 |
| 2015/0338204 A1* | 11/2015 | Richert | G06T 7/593 |
| | | | 348/135 |
| 2015/0370251 A1* | 12/2015 | Siegel | G05D 1/0027 |
| | | | 701/2 |

OTHER PUBLICATIONS

"International Application Serial No. PCT/US2017/019955, Written Opinion dated May 24, 2017", 7 pgs.

\* cited by examiner

ENABLING DYNAMIC SENSOR DISCOVERY IN AUTONOMOUS DEVICES

BACKGROUND

Conventional autonomous vehicles presently have the ability to use external sensors to aid in navigation and route determination. However, external sensors must be statically defined in order to be used by conventional autonomous vehicles. By requiring external sensors to be statically defined, an autonomous vehicle may be limited to a defined course in which the external sensors are known. That is, static definition of sensors may reduce an ability of an autonomous vehicle to take variable routes or to navigate to unplanned destinations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Examples of sensor discovery systems described herein may enable dynamic sensor discovery in autonomous devices. Autonomous devices may be capable of routing and navigating an environment between a current location and a destination location without human input by using on-board sensors and external sensors along planned routes. The autonomous device may request sensor information from a data server and the data server may provide sensor information corresponding to a set of sensors selected from a database of sensors based on the location of the autonomous device and the destination location. The data server may store a database entry having respective sensor information for each of a plurality of sensors, and may query the database for relevant records response to the request from the autonomous device. The autonomous device may be a robot, an automobile or other vehicle, or may be a handheld device that is capable of communicating with sensors and/or the central server over a network.

Figure 1:
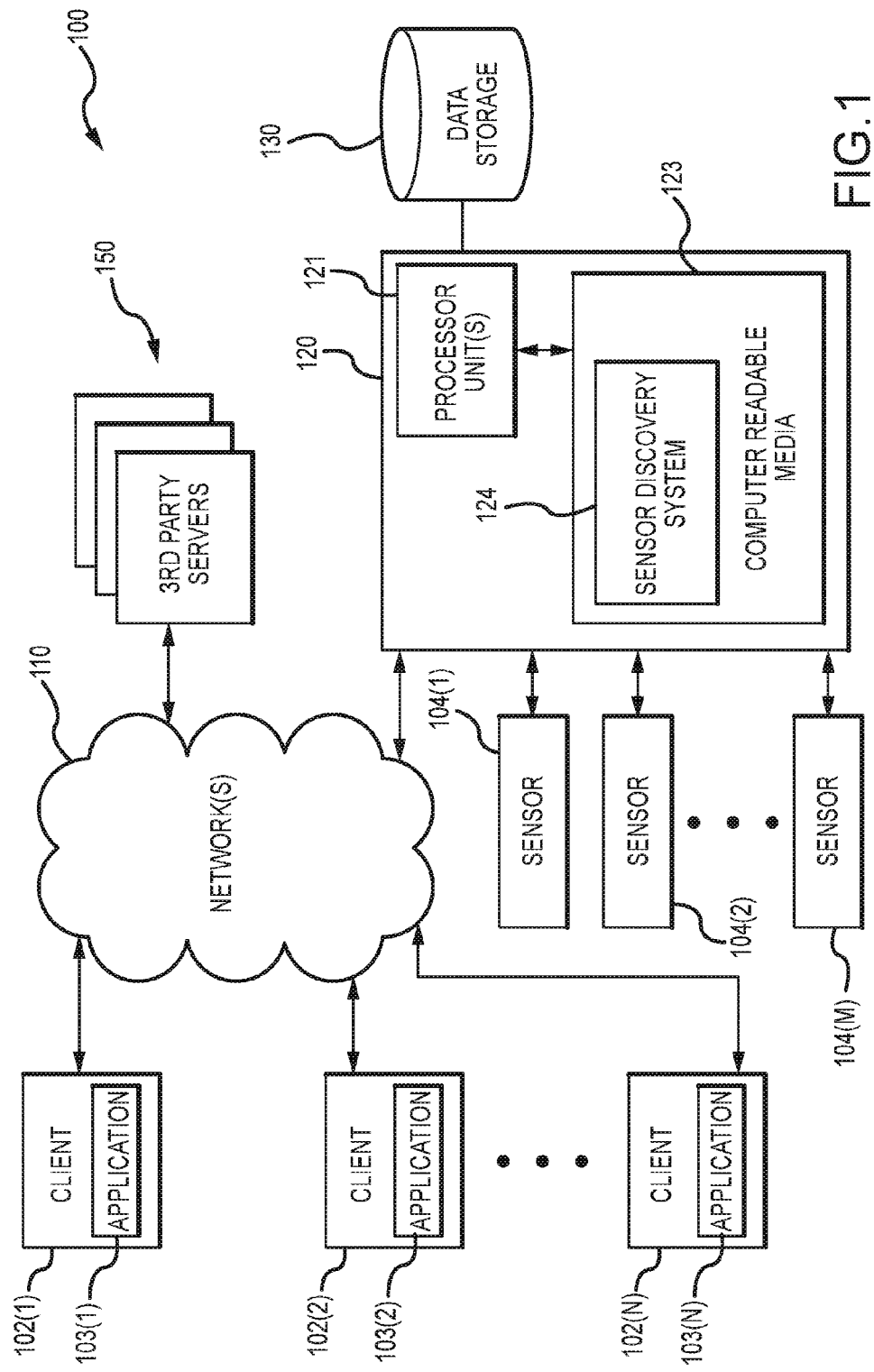
FIG. 1 illustrates components of a system to enable dynamic sensor discovery in accordance with some embodiments.

FIG. 1 illustrates a sensor communication system (system) 100 according to an embodiment of the disclosure. The system 100 may be used to register sensors 104(1-M) with data server 120, and the data server 120 may provide sensor information to a client (e.g., device(s), component(s), circuit(s), vehicle(s), etc.) of clients 102(1-N) responsive to a request from the client. Each of the clients 102(1-N) may include an autonomous device including a transceiver and a computer readable medium (or multiple computer readable media) encoded with executable instructions that may be executable by one or more processing units (not shown in FIG. 1) of the client 102(1-N) for transmitting, receiving, encoding, and/or decoding data from the sensors 104(1-M) or the data server 120, such as an application 103(1-N) on the respective client 102(1-N). In some examples, each of the clients 102(1-N) may include interfaces, circuits, and/or modules (e.g., a sensor communication interface, a server communication interface, an obstacle avoidance module, etc.) for transmitting, receiving, encoding, and/or decoding data from the sensors 104(1-M) or the data server 120. The interfaces or modules may be instructions stored on a machine-readable medium of the client 102(1-N) to be executed by a processor unit of the client 102(1-N), a circuit, floating point gate array, application-specific integrated circuit, some other hardware of the client 102(1-N) to implement the module, or combinations thereof.

Each of the clients 102(1-N) may be coupled to a network 110 to provide sensor information requests (e.g., using the server communication interface controlling the transceiver of an autonomous vehicle of the client) to the data server 120 and/or sensor connection requests to the sensors 104(1-M) (e.g., using the sensor communication interface controlling the transceiver of an autonomous vehicle of the client), and to receive sensor information (e.g., using the sensor control interface controlling the transceiver of the client) from the data server 120 and/or sensor information from the sensors 104(1-M) directly or via the network 110.

The network 110 may be implemented using one or more networks, such as, but not limited to, local area networks (LANs), wide area networks (WANs), metropolitan area networks (MANs), cellular networks, and/or the Internet. Communications provided to, from, and within the network 110 may be wired and/or wireless, and further may be provided by any networking devices known in the art, now or in the future. Devices communicating over the network 110 may communicate with any communication protocol, including, but not limited to, TCP/IP, UDP, RS-232, and IEEE 802.11, Long-Term Evolution (LTE) or LTE advanced wireless communication, or any other cellular/wireless communication standard.

The sensors 104(1-M) may include many different types of sensors or may all be homogenous. Examples of sensor types may include infrared, temperature, sound, video, temperature, speed, humidity. Each of the sensors 104(1-M) may have certain characteristics, such as a data type (e.g., format of the data), location, orientation, range, application program interface(s) (APIs), query interfaces, channel information, or any combination thereof. Each of the sensors 104(1-M) may include a transceiver, a server communication interface, a device communication interface, a sensing and data collection module, or combinations thereof. The interfaces or modules may be instructions stored on a machine-readable medium of the sensor 104(1-M) to be executed by a processor unit of the sensor 104(1-M), a circuit, floating point gate array, application-specific integrated circuit, some other hardware of the sensor 104(1-M) to implement the module, or combinations thereof.

Acting as a central engine, the data server 120 may provide, process, and/or communicate with interfaces, modules and/or circuits (e.g., a transceiver, a sensor communication interface, a sensor registration module, a sensor selection module, a device communication interface) to register the sensors 104(1-M) (e.g., using the sensor communication interface controlling the transceiver and the sensor registration module), construct a map of the sensors 104(1-M) (e.g., using the sensor selection module), control access to the sensors 104(1-M) (e.g., using the device or sensor communication interface controlling the transceiver), and provide recommendations of relevant sensors responsive to requests from the clients 102(1-N) (e.g., using the device communication interface controlling the transceiver). The interfaces or modules may be instructions stored on the machine-readable media 123 to be executed by the processor units 121, a circuit, floating point gate array, application-specific integrated circuit, some other hardware of the data server 120 to implement the module, or combinations thereof. The data server 120 may include one or more processing units 121 and computer readable media 123. The computer readable media 123 may encode instructions for a sensor discovery system 124, which may include a sensor communication interface, a sensor registration module, a device communication interface, a sensor selection module, etc. For example, the instructions for the sensor discovery system 124 may receive registration requests via the transceiver of the data server 120 from the sensors 104(1-M), and, in response to the registration requests, the sensor registration module may create an entry including sensor information for each of the sensors 104(1-M) in a database. The database may be stored in data storage 130. The sensor information may include data feed subscription information associated with a respective sensor, such as a sensor type (e.g., infrared, temperature, sound, video, temperature, speed, humidity), a data type (e.g., format of the data), location, orientation, range, application program interface(s) (APIs), query interfaces, or any combination thereof.

The instructions for the sensor discovery system 124 may also receive and respond to the requests for sensor information from the clients 102(1-N). For example, a client of the clients 102(1-N) may request sensor information from the data server 120 using a server communication interface controlling the transceiver of the autonomous device based on, e.g., a current location, a destination location, a planned route, a sensor type, a sensor orientation, a client type, etc. The sensor selection module may query the database in the data storage 130 based on the request and provide sensor information associated with each of one or more of the sensors 104(1-M) responsive to the request using the device communication interface controlling the transceiver of the data server. The instructions for the sensor discovery system 124 stored on the computer readable media 123 may be executed on the one or more processing units 121 or other processing units.

The clients 102(1-N) may communicate to the data server 120 via the network 110 to request sensor information based on current location, destination location, client type, and/or some other criteria. The clients 102(1-N) may determine a route using an obstacle avoidance interface based on the sensor information. In some examples, the sensor information may include routing information. In other examples, the sensor information may include data feed subscription information for a selected set of the sensors 104(1-M) that are relevant to the request.

In some embodiments, third party servers 150 may store a data feed for one or more of the sensors 104(1-M) and the sensor information may include instructions for accessing the data feed stored at the third party servers 150.

In operation, the data server 120 and the sensors 104(1-M) may engage in a registration process whereby sensor information for each of the sensors 104(1-M) is stored in a respective database entry at the data storage 130. In some embodiments, the registration process may a dynamic registration process where, using the server communication interface controlling the transceiver of the sensor, each sensor sends a registration message with respective sensor information to the data server 120 or responds to a registration request from the data server 120 with the registration message. Using the server registration module, the data server 120 may create or update a database entry in data storage 130 for each sensor 104(1-M) responsive to receiving the respective registration message. In other embodiments, the database may be a static database that is manually updated as new sensors come online or as information changes for existing sensors. The sensor information for each of the sensors 104(1-M) may include a sensor type, a data type, location, orientation, range, APIs, query interfaces, channel information, or any combination thereof. The database may be used to construct a map of the sensors 104(1-M) that are available to the clients 102(1-N). In some embodiments, the data server 120 may include a sensor subscription module that, along with the sensor communication interface, subscribes to the data feeds of the sensors 104(1-M) and analyzes the data feeds of the sensors 104(1-M). Further, the data server 120 may control access to and monitor connections to each of the sensors 104(1-M) using the sensor communication interface.

The respective applications 103(1-N) of each of the clients 102(1-N) may request sensor information from the data server 120 using the server communication interface controlling the transceiver of the autonomous device of the client. The clients 102(1-N) may include the autonomous or semi-autonomous device that is capable of navigating from one location to another. In some examples, the autonomous devices may be capable of navigating around inside a building or other space with a defined perimeter, such as a park without human input. In some examples, the autonomous device may be capable of navigating on streets, roads, highways, freeways, etc., without human input. In some examples, the autonomous devices may be capable of navigating in an off-road setting, such as a disaster response setting or a military battle setting without human input.

The clients 102(1-N) may use the sensor discovery system for pre-discovery of sensors that are not yet in range along a planned route, for requests of sensors that can provide insight into areas occluded (e.g., around a corner) from sensors on the clients 102(1-N). The request may include location of the requesting client, planned route information, destination location, client type, desired sensor characteristics (e.g., sensor type, partial or full movement, etc.), a specified sensor orientation, etc. Responsive to receiving the request, the data server 120 may provide sensor information for selected sensors of the sensors 104(1-M) to the requesting client using the sensor selection module and the device communication interface. For example, sensor selection module of the data server 120 may query the database at the data storage 130 for sensors that are responsive to the request. In some examples, the request may be for available sensors alone a planned route between a current location and a destination location. The sensor selection module of the data server 120 may query the database to select relevant sensors of the sensors 104(1-M) along the planned route. In other examples, the request may be for sensor information for all sensors along any route between the current location and the destination location.

In some examples, the device communication interface of the data server 120 may provide the data feed subscription information for each of the selected sensors to the requesting client, which may be subscribed to and captured at the data server 120 using the sensor subscription module. The data feed subscription information may include a sensor type, a data type, location, orientation, range, APIs, query interfaces, channel information, or any combination thereof. In some example, the sensor selection module of the data server 120 may restrict access to (e.g., withhold sensor information) a sensor that has no available channels or to a client that is not authorized (e.g., based on client type) to access the sensor.

The requesting client may use the sensor information to subscribe to data feeds of one or more of the selected sensors using the sensor communication interface controlling the transceiver of the autonomous device to retrieve data. In some examples, subscription to the data feed may be received through the data server 120, rather than directly from the selected sensors, and may be received via the server communication interface of the requesting client. The obstacle avoidance module of the requesting client may analyze the data feeds from the one or more sensors to determine route information between the destination location and the current location. For example, the obstacle avoidance module of the requesting client may select a route that is within a temperature envelope, a route that has pathways or roads that can facilitate the physical size (e.g., is wide enough or has enough height clearance) or weight (e.g., paths or roads that have weight limits) of the requesting client, routes that are free of obstacles or traffic, or any combination thereof. In addition, the route information may include terrain information, incline information, speed information, etc.

As the requesting client navigates from one location to another, it may send another request for sensor information to the data server 120 using the server communication interface. The sensor selection module of the data server 120 may again query the database to select sensors of the sensors 104(1-M) that reside in areas relevant to possible routes between the new location and the previous or a new destination location. Thus, the requesting client may use the data server 120 to dynamically update a list of available sensors prior to detection (e.g., outside the sensor range) of a sensor by the requesting client, rather than requiring that all sensor information be statically loaded beforehand or only allow detection when the requesting client is within a detection range. Further, when a data feed of a sensor is provided through the data server 120 or the third party servers 150 prior to the requesting client being within a detection range of the sensor, the requesting client may be afforded enough time to analyze the data from the sensor before it becomes obsolete to the obstacle avoidance module of the requesting client. For example, when the requesting client is only able to initiate access to a data feed of a sensor when in a detection range of the sensor, the sensed data may be received too late to be useful to the client (e.g., the requesting client is moving too fast). Allowing the clients 102(1-N) to dynamically update available sensors may improve portability of the clients 102(1-N) to other environments and may improve routing and navigation capabilities.

In some examples, one or more of the sensors 104(1-M) may store sensor data feeds at third party servers 150, and the sensor information may include information to access the stored sensor data feeds at the third party servers 130. Further, in some examples one or more of the sensors 104(1-M) may be included on or at one or more of the clients 102(1-N) such that others of the clients 102(1-N) may access data feeds from sensors of a client 102(1-N).

Figure 2:
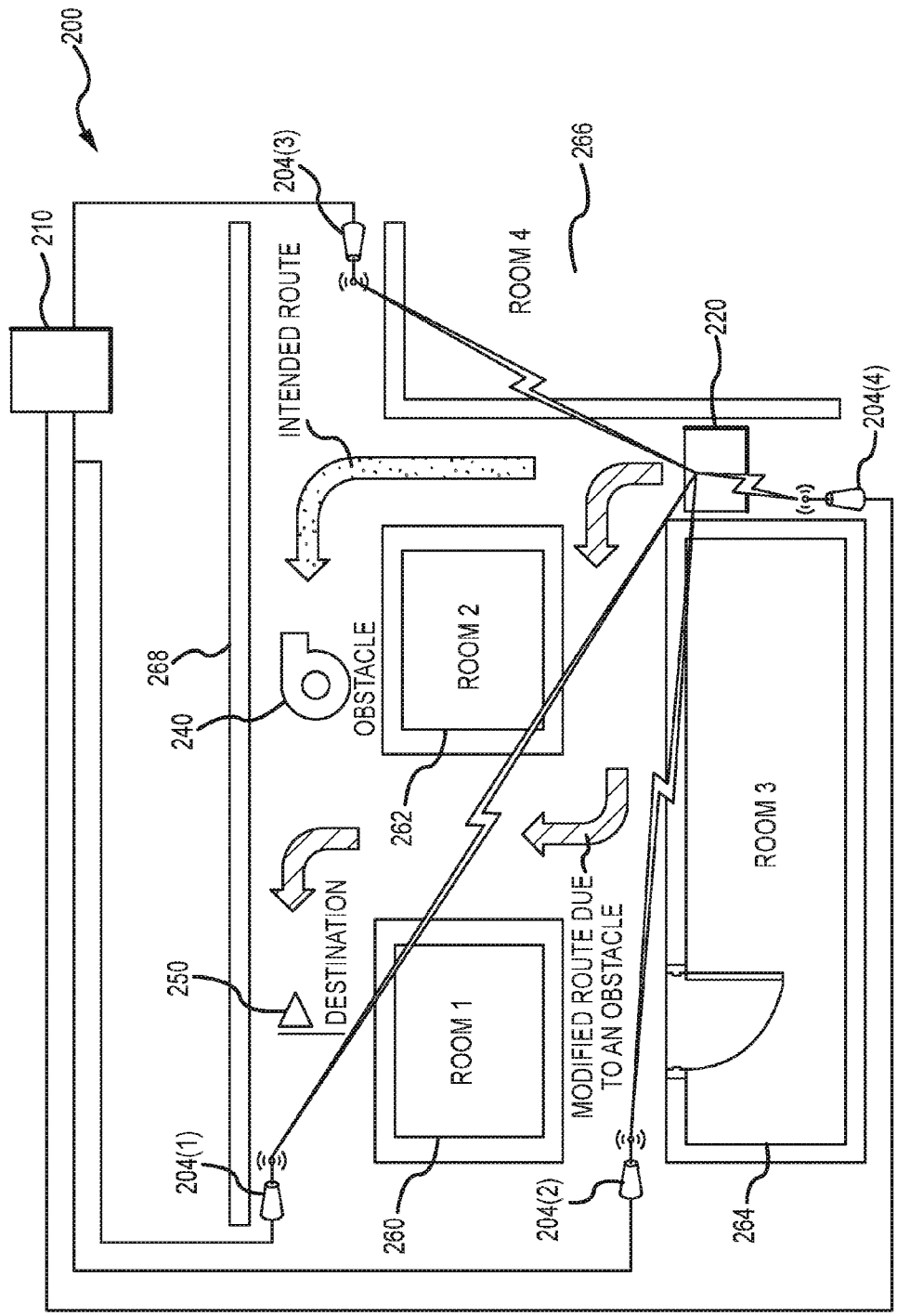
FIG. 2 illustrates components of an exemplary system to enable dynamic sensor discovery in accordance with some embodiments.

FIG. 2 illustrates an exemplary use case for a sensor communication system (system) 200 according to an embodiment of the disclosure. The system 200 may be used to register sensors 204(1-4) with a data server 210, and the data server 210 may provide sensor information to a client 220 responsive to a request from the client 220. The client 220 may require a route to navigate from a current location to a destination location 250. Routing may consider obstacles such as an obstacle 240, walls of a first room 260, walls of a second room 262, walls of a fourth room 266, walls of a third room 264 and a wall 268. The data server 210 may be implemented in one or more of the data server 120 of FIG. 1. The client 220 may be implemented in one or more of the clients 102(1-N) of FIG. 1. The sensors 204(1-4) may be implemented in the sensors 104(1-M) of FIG. 1.

The sensors 204(1-4) may include many different types of sensors or may all be homogenous. Examples of sensor types may include infrared, temperature, sound, video, temperature, speed, humidity. Each of the sensors 204(1-4) may have certain characteristics, such as a data type (e.g., format of the data), location, orientation, range, APIs, query interfaces, channel information, or any combination thereof.

The data server 210 may receive registration requests from the sensors 204(1-4), and, in response to the registration requests, may create an entry including sensor information for each of the sensors 204(1-4) in a database. The sensor information may include data feed subscription information associated with a respective sensor, such as a sensor type, a data type, location, orientation, range, APIs, query interfaces, or any combination thereof. The data server 210 may also receive and respond to the requests for sensor information from the client 220. For example, the client 220 may request sensor information from the data server 210 based on, e.g., a current location, a destination location, a client type, etc. The data server 210 may query the database based on the request and provide sensor information associated with selected sensors of the sensors 204(1-4) responsive to the request.

The client 220 may be coupled to a network to provide sensor information requests to the data server 210 and/or sensor connection requests to the sensors 204(1-4), and to receive sensor information from the client 220 and/or sensor subscription data feeds from the sensors 204(1-4).

In operation, the data server 210 and the 204(1-4) may engage in a registration process whereby sensor information for each of the sensors 204(1-4) is stored in a respective database entry at the data server 210. In some embodiments, the registration process may a dynamic registration process whereby each new sensor sends a registration message with respective sensor information to the data server 210 or responds to a registration request from the data server 210 with the registration message. The data server 210 may create or update a database entry for each sensor 204(1-4) responsive to receiving the respective registration message. In other embodiments, the database may be a static database that is manually updated as new sensors come online or as information changes for existing sensors. The sensor information for each of the sensors 204(1-4) may include a sensor type (e.g., infrared, temperature, sound, video, temperature, speed, humidity), a data type (e.g., format of the data), location, orientation, range, APIs, query interfaces, or any combination thereof. The database may be used to construct a map of the sensors 204(1-4) that are available to the client 220. In some embodiments, the data server 210 may subscribe to the data feeds of the sensors 204(1-4) and the data server 210 may analyze the data feeds of the sensors 204(1-4).

The client 220 may include an autonomous or semi-autonomous device that is capable of navigating from a current location to the destination location 250, such as a robot or vehicle. The client 220 may use the sensor discovery system for pre-discovery of sensors that are not yet in range along a planned route, for requests of sensors that can provide insight into areas occluded (e.g., around a corner) from sensors on the client 220. In the example depicted in FIG. 2, the client 220 may be capable of navigating in one or more of the pathways between the first room 260, the second room 262, the third room 264, the fourth room 266, and the wall 268 to the destination location 250. The request may include location of the requesting client, planned route information, the destination location 250, client type, desired sensor characteristics (e.g., sensor type, partial or full movement, etc.), a specified, sensor orientation, etc.

Responsive to receiving the request, the data server 210 may provide sensor information for selected sensors of the sensors 204(1-4) based on the request. The request for sensor information may include a request for data feed subscription information for available sensors that may be useful in routing between a current location and the destination location 250. The data server 210 may select sensors of the sensors 204(1-4) (e.g., from the map of the sensors 204(1-4) that reside in areas relevant to possible routes between the current location and the destination location, and may provide the data feed subscription information for each of the selected sensors to the client 220. The data feed subscription information may include a sensor type, a data type, location, orientation, range, APIs, query interfaces, or any combination thereof. The client 220 may use the sensor information to subscribe to data feeds of one or more of the selected sensors to retrieve data. The client 220 may analyze the data feeds from the one or more sensors to determine a route to the destination location from the current location. In some examples, the data feeds may be provided to the client 220 via the data server 210, rather than directly from the sensors 204(1-4).

In one particular example, the client 220 may have planned a first route between fourth room 266 and the second room 262, before turning left and navigating parallel to the wall 268 to the destination location 250. However, responsive to detection of the obstacle 240, the client 220 may send a request for sensor information that identifies sensors along a second planned route to the destination location 250 that navigates between second room 262 and the third room 264, before turning right between the first room 260 and the second room 262, and then turning left between the first room 260 and the wall 268. Responsive to the request, the data server 210 may provide sensor information associated with the sensor 204(2), which may not have been relevant to the first route, along with sensor information for the sensors 204(1 and 4). The client 220 may analyze the data feeds of the sensor 204(2) in addition to the data feeds of the sensors 204(1 and 4) to determine that the second route is a navigable. Allowing the client 220 to update a planned route, and discover other sensors dynamically, the client 220 is able to adapt to unplanned situations that may prevent navigation.

Figure 3:
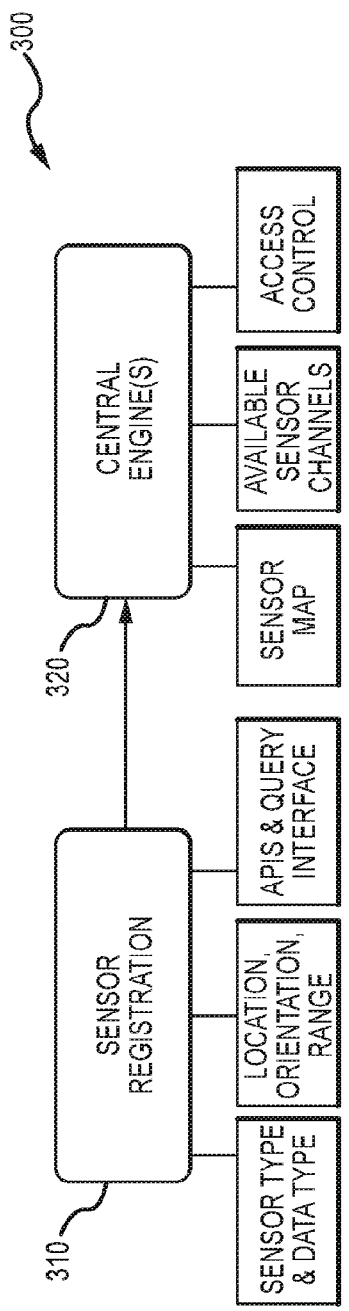
FIG. 3 illustrates a flow diagram of a sensor registration to enable dynamic sensor discovery in accordance with some embodiments.

FIG. 3 is a data and control flow diagram 300 illustrating sensor registration in a sensor discovery system. The flow diagram 300 may include a sensor registration 310 and central engine(s) 320. The sensor registration 310 may include registration information for a sensor, such as one of the sensors 104(1-M) of FIG. 1 and/or the sensors 204(1-4) of FIG. 2. The sensor registration 310 may be information stored in an entry in a database for a particular sensor. The sensor registration may be included in a registration message. The sensor registration 310 may include a sensor type, data type, logistical information (e.g., location, orientation, and range), and access information (e.g., APIs and query interface).

The central engine(s) 320 may use the sensor registration 310 for each sensor to select sensors responsive to a request from a client, such as one of the clients 102(1-N) or the client 220. The central engine(s) 320 may construct a map of the sensors based on the sensor registration 310 to make the selection of sensors. Further, the central engine(s) 320 may maintain control over access to the sensors, as well as inventory of available sensor channels for each sensor, and to which clients each sensor channel is allocated.

Figure 4:
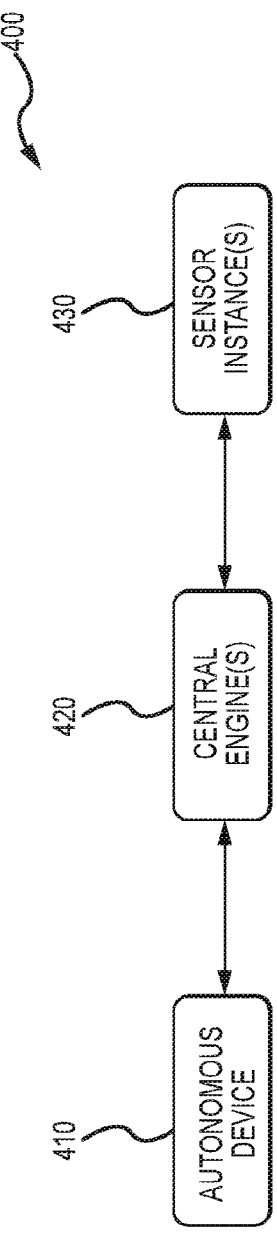
FIG. 4 illustrates a flow diagram of to enable dynamic sensor discovery in accordance with some embodiments.

FIG. 4 is a data and control flow diagram 400 illustrating sensor discovery in a sensor discovery system. The flow diagram 400 may include an autonomous device 410, central engine(s) 420, and a sensor instance(s) 430. The autonomous device 410 may be a device that is capable of sensing and navigating its environment without human input, and may be included in one of the clients 102(1-N) of FIG. 1 and/or the client 220 of FIG. 2. The autonomous device 410 may use the sensor discovery system for pre-discovery of sensors that are not yet in range along a planned route, for requests of sensors that can provide insight into areas occluded (e.g., around a corner) from sensors on the autonomous device 410. The request may include location of the requesting client, planned route information, destination location, client type, desired sensor characteristics (e.g., sensor type, partial or full movement, etc.), a specified sensor orientation, etc.

Responsive to receiving the request, the central engine(s) 420 may provide sensor information for selected sensors. For example, the central engine(s) 420 may query a database for sensors that are responsive to the request. In some examples, the request may be for available sensors alone a planned route between a current location and a destination location. The central engine(s) 420 may query the database to select relevant sensors along the planned route. The sensor instance(s) 430 may be different sensors that are available to provide data feeds. For the selected sensors, the central engine(s) 420 may act as a conduit to provide a data feed from the sensor instance(s) 430 to the autonomous device 410, or may provide API and query information to the autonomous device 410, allowing the autonomous device 410 to subscribe to a data feeds of the sensor instance(s) 430 directly. The autonomous device 410 may use data feeds from the selected sensor instances to determine routing information. In other examples, the central engine(s) 420 may process data feeds from the selected sensor instances to provide routing information to the autonomous device 410. In some examples, the routing information may include speed and terrain data, as well as directional data.

Figure 5:
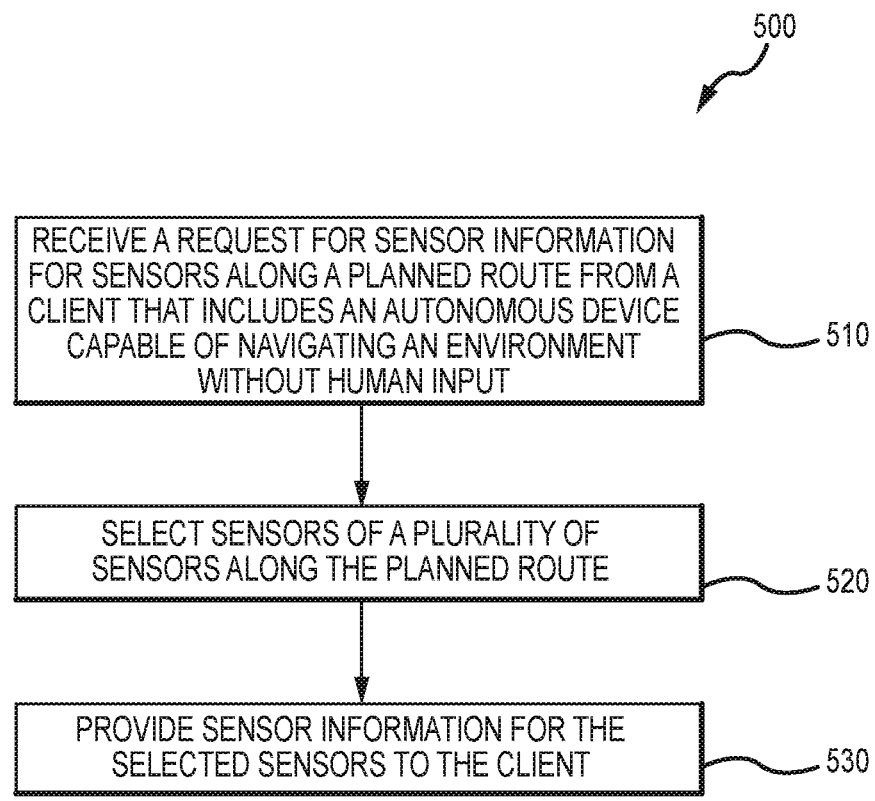
FIG. 5 illustrates a method to enable dynamic sensor discovery in accordance with some embodiments.

FIG. 5 illustrates a method 500 for sensor discovery in an autonomous device in accordance with some embodiments. The method 500 may be implemented in the data server 120 and/or the third party servers 150 of FIG. 1, the data server 210 of FIG. 2, the central engine(s) 320 of FIG. 3, the central engine(s) 420 of FIG. 4, or combinations thereof.

The method 500 may include receiving a request for sensor information for sensors along a planned route from a client, at 510. The client may include an autonomous device capable of navigating an environment without human input. The client may be any of the clients 102(1-N) of FIG. 1, the client 220 of FIG. 2, the autonomous device 410 of FIG. 4, or combinations thereof.

In some examples, the method 500 may further include receiving registration message from a sensor of the plurality of sensors. The plurality of sensors may include the sensors 104(1-M) of FIG. 1, the sensors 204(1-4) of FIG. 2, the sensor instance(s) 430 of FIG. 4, or combinations thereof. The registration message may include respective sensor information for the sensor. In some examples, the method 500 may further include creating an entry in the database for the sensor, the entry including the sensor information. The sensor information received from the sensor may include a location, an orientation, a range, a sensor type, a data type, an application program interface, a query interfaces, or combinations thereof in some examples, the method 500 may further include constructing a map of the plurality of sensors from the database.

The method 500 may further include selecting sensors of a plurality of sensors along the planned route, at 520. The plurality of sensors may include the sensors 104(1-M) of FIG. 1, the sensors 204(1-4) of FIG. 2, the sensor instance(s) 430 of FIG. 4, or combinations thereof. In some examples, the method 500 may further include querying a database to determine which of the plurality of sensors are along the planned route. In some examples, the method 500 may further include withholding sensor information a sensor of the plurality or sensors to which the client is restricted from accessing. In some examples, selection of the selected sensors may be based on locations on the map of the plurality of sensors. In some examples, at least one of the selected sensors may be outside a detection range of the client.

The method 500 may further include provide sensor information for the selected sensors to the client, at 530. In some examples, the method 500 may further include providing a data feed of a sensor of the selected sensors to the client. In some examples, the method 500 may further include allocating a channel of a data feed from a sensor of the selected sensors to the client.

Figure 6:
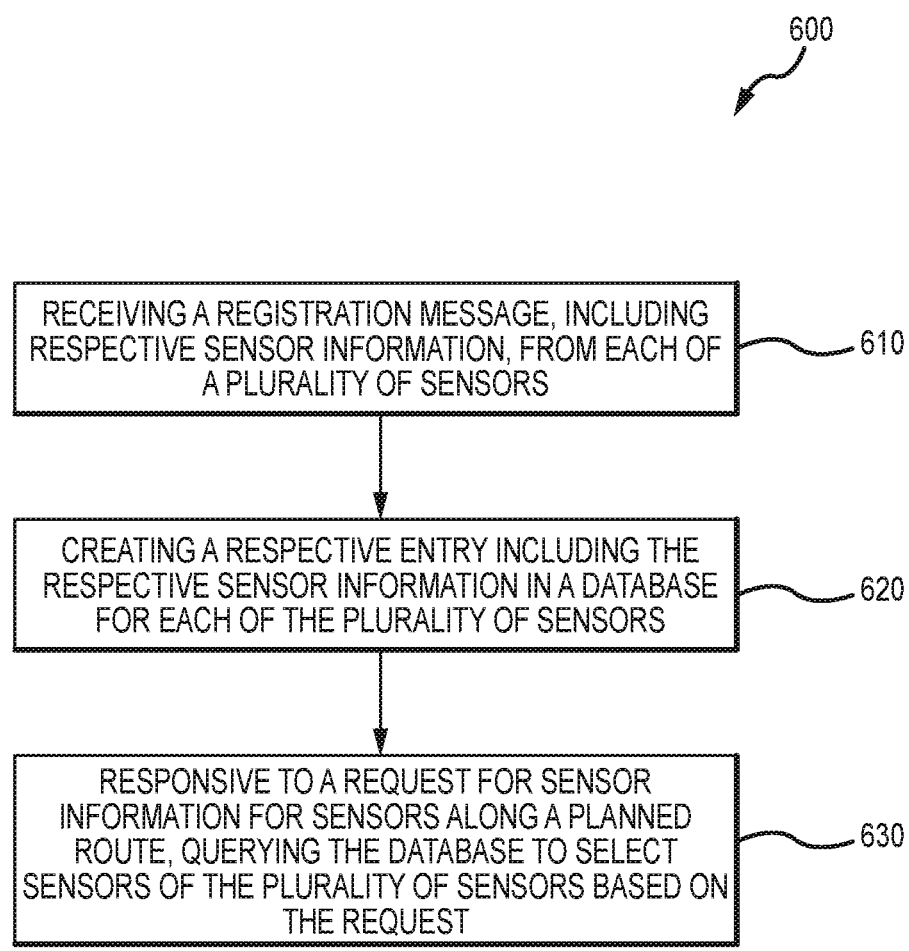
FIG. 6 illustrates a method to enable sensor registration in accordance with some embodiments.

FIG. 6 illustrates a method 600 for sensor discovery in an autonomous device in accordance with some embodiments. The method 600 may be implemented in the data server 120 and/or the third party servers 150 of FIG. 1, the data server 210 of FIG. 2, the central engine(s) 320 of FIG. 3, the central engine(s) 420 of FIG. 4, or combinations thereof.

The method 600 may include receiving a registration message from each of a plurality of sensors, the registration message including respective sensor information, at 610. The client may include an autonomous device capable of navigating an environment without human input. The client may be any of the clients 102(1-N) of FIG. 1, the client 220 of FIG. 2, the autonomous device 410 of FIG. 4, or combinations thereof. The registration message may include a sensor type, a data type, a location, an orientation, a range, an application program interface, a query interfaces, or any combination thereof.

The method 600 may include creating a respective entry in a database for each of the plurality of sensors, at 620. The plurality of sensors may include the sensors 104(1-M) of FIG. 1, the sensors 204(1-4) of FIG. 2, the sensor instance(s) 430 of FIG. 4, or combinations thereof. Each respective entry in the database may include the respective sensor information of the corresponding sensor of the plurality of sensors. In some examples, the method 600 may further include creating a map of the plurality of sensors from the database.

The method 600 may include, responsive to a request for sensor information for sensors along a planned route, querying the database to select sensors of the plurality of sensors based on the request, at 630. In some examples, the method 600 may further include selecting the sensors from the map. The request may be received from a client including an autonomous device, such as any of the clients 102(1-N) of FIG. 1, the client 220 of FIG. 2, the autonomous device 410 of FIG. 4, or combinations thereof.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

Additional Notes & Examples

Example 1 includes subject matter (such as a device, apparatus, or machine) to enable dynamic sensor discovery comprising: an autonomous device including a transceiver, the autonomous device capable of navigating from a current location to a destination location using sensor data; a server communication interface to control the transceiver to provide a request for sensor information for sensors along a planned route and to receive respective sensor information for each of a set of selected sensors selected by a data server based on the request; a sensor communication interface to control the transceiver to subscribe to a data feed of a sensor of the set of selected sensors along the planned route based on sensor information corresponding to the sensor; and an obstacle avoidance interface to analyze the data feed to determine whether to proceed with the planned route.

In Example 2, the subject matter of Example 1 may include, wherein the request further includes a desired sensor type, wherein the set of selected sensors selected by the data server is further based on the desired sensor type.

In Example 3, the subject matter of any one of Examples 1 to 2 may include, wherein, responsive to detection of an obstacle by the obstacle avoidance interface, the server communication interface controls the transceiver to provide a second request for sensor information for sensors along a second planned route and receives respective sensor information for each of a second set of selected sensors selected by the data server based on the second request.

In Example 4, the subject matter of any one of Examples 1 to 3 may include, wherein the sensor information for the sensor of the set of selected sensors includes at least one of an application program interface or a query interface.

In Example 5, the subject matter of any one of Examples 1 to 4 may include, wherein at least one of the set of selected sensors is outside a detection range of the client.

Example 6 includes subject matter (such as a device, apparatus, or machine) to enable dynamic sensor discovery comprising: a device interface controlling a transceiver to receive a request for the sensor information for sensors along a planned route from a device that includes an autonomous device that is capable of navigating from a current location to a destination location using sensor data, the device interface controlling the transceiver further to provide sensor information for each of a set of selected sensors to the client; and a sensor selection module to select the set of selected sensors of a plurality of sensors along the planned route responsive to the request.

In Example 7, the subject matter of Example 6 may include, wherein the request further includes a desired sensor type, wherein the sensor selection module selects the set of sensors of the plurality of sensors along the planned route based on the desired sensor type.

In Example 8, the subject matter of any one of Examples 6 to 7 may include, wherein the device interface controlling the transceiver receives a second request for sensor information for sensors along a second planned route and provides the sensor information for each of a second set of selected sensors to the client, wherein the sensor selection module selects a second set of selected sensors of the plurality of sensors along the second planned route responsive to the second request.

In Example 9, the subject matter of any one of Examples 6 to 8 may include, a sensor communication interface controlling the transceiver to receive the sensor information from each of the plurality of sensors, wherein the sensor information from a sensor of the plurality of sensors includes at least one of a location, an orientation, or a range.

In Example 10, the subject matter of any one of Examples 6 to 9 may include, wherein the sensor information from the sensor of the plurality of sensors includes a sensor type and a data type.

In Example 11, the subject matter of any one of Examples 6 to 10 may include, wherein the sensor information from the sensor of the plurality of sensors an application program interface or a query interface.

In Example 12, the subject matter of any one of Examples 6 to 11 may include, wherein the sensor selection module constructed a map of the plurality of sensors from the database and selects the set of selected sensors based on locations on the map of the plurality of sensors.

In Example 13, the subject matter of any one of Examples 6 to 12 may include, wherein the sensor selection module withholds sensor information for a sensor of the plurality or sensors to which the client is restricted from accessing.

In Example 14, the subject matter of any one of Examples 6 to 13 may include, wherein the sensor selection module maintains a list of available channels for a sensor of the plurality of sensors.

Example 15 includes subject matter (such as a method, means for performing acts, machine readable medium including instructions that when performed by a machine cause the machine to performs acts, or an apparatus to perform) to enable dynamic sensor discovery comprising: receiving a request for sensor information for sensors along a planned route from a client, wherein the client includes an autonomous device capable of navigating an environment without human input; selecting sensors of a plurality of sensors along the planned route; and providing sensor information for the selected sensors to the client.

In Example 16, the subject matter of Example 15 may include, querying a database to determine which of the plurality of sensors are along the planned route.

In Example 17, the subject matter of any one of Examples 15 to 16 may include, providing a data feed of a sensor of the selected sensors to the client.

In Example 18, the subject matter of any one of Examples 15 to 17 may include, allocating a channel of a data feed from a sensor of the selected sensors to the client.

In Example 19, the subject matter of any one of Examples 15 to 18 may include, withholding sensor information a sensor of the plurality or sensors to which the client is restricted from accessing.

In Example 20, the subject matter of any one of Examples 15 to 19 may include, receiving registration message from a sensor of the plurality of sensors, the registration message including respective sensor information for the sensor; and creating an entry in the database for the sensor, the entry including the sensor information.

In Example 21, the subject matter of any one of Examples 15 to 20 may include, wherein the sensor information received from the sensor at the data server includes at least one of a location, an orientation, or a range.

In Example 22, the subject matter of any one of Examples 15 to 21 may include, wherein the sensor information received from the sensor at the data server includes a sensor type and a data type.

In Example 23, the subject matter of any one of Examples 15 to 22 may include, wherein the sensor information received from the sensor at the data server includes an application program interface or a query interface.

In Example 24, the subject matter of any one of Examples 15 to 23 may include, constructing a map of the plurality of sensors from the database, wherein selection of the selected sensors based on locations on the map of the plurality of sensors.

In Example 25, the subject matter of any one of Examples 15 to 24 may include, wherein at least of the selected sensors is outside a detection range of the client.

Example 26 includes at least one medium including instructions that, when executed on a machine cause the machine to perform any of the methods of Examples 15-25.

Example 27 includes an apparatus comprising means for performing any of the Examples 15-25.

Example 28 includes subject matter (such as a method, means for performing acts, machine readable medium including instructions that when performed by a machine cause the machine to performs acts, or an apparatus to perform) to enable dynamic sensor discovery comprising: receiving a registration message from each of a plurality of sensors, the registration message including respective sensor information; creating a respective entry in a database for each of the plurality of sensors, each respective entry in the database includes the respective sensor information of the corresponding sensor of the plurality of sensors; and responsive to a request for sensor information for sensors along a planned route, querying the database to select sensors of the plurality of sensors based on the request.

In Example 29, the subject matter of Example 28 may include, creating a map of the plurality of sensors from the database; and selecting the sensors from the map.

In Example 30, the subject matter of any one of Examples 28 to 29 may include, wherein the registration message includes at least one of a sensor type, a data type, a location, an orientation, a range, an application program interface, or a query interface.

Example 31 includes at least one medium including instructions that, when executed on a machine cause the machine to perform any of the methods of Examples 28-30.

Example 32 includes an apparatus comprising means for performing any of the Examples 28-30.

Example 33 includes subject matter (such as a device, apparatus, or machine) to enable dynamic sensor discovery comprising: means for receiving a request for sensor information for sensors along a planned route from a client, wherein the client includes an autonomous device capable of navigating an environment without human input; means for selecting sensors of a plurality of sensors along the planned route; and means for providing sensor information for the selected sensors to the client.

In Example 34, the subject matter of Example 33 may include, means for querying a database to determine which of the plurality of sensors are along the planned route.

In Example 35, the subject matter of any one of Examples 33 to 34 may include, means for providing a data feed of a sensor of the selected sensors to the client.

In Example 36, the subject matter of any one of Examples 33 to 35 may include, means for allocating a channel of a data feed from a sensor of the selected sensors to the client.

In Example 37, the subject matter of any one of Examples 33 to 36 may include, means for withholding sensor information a sensor of the plurality or sensors to which the client is restricted from accessing.

In Example 38, the subject matter of any one of Examples 33 to 37 may include, means for receiving registration message from a sensor of the plurality of sensors, the registration message including respective sensor information for the sensor; and means for creating an entry in the data base for the sensor, the entry including the sensor information.

In Example 39, the subject matter of any one of Examples 33 to 38 may include, wherein the sensor information received from the sensor at the data server includes at least one of a location, an orientation, or a range.

In Example 40, the subject matter of any one of Examples 33 to 39 may include, wherein the sensor information received from the sensor at the data server includes a sensor type and a data type.

In Example 41, the subject matter of any one of Examples 33 to 40 may include, wherein the sensor information received from the sensor at the data server includes an application program interface or a query interface.

In Example 42, the subject matter of any one of Examples 33 to 41 may include, means for constructing a map of the plurality of sensors from the database, wherein selection of the selected sensors based on locations on the map of the plurality of sensors.

In Example 43, the subject matter of any one of Examples 33 to 42 may include, wherein at least of the selected sensors is outside a detection range of the client.

Example 44 includes subject matter (such as a device, apparatus, or machine) to enable dynamic sensor discovery comprising: means for receiving a registration message from each of a plurality of sensors, the registration message including respective sensor information; means for creating a respective entry in a database for each of the plurality of sensors, each respective entry in the database includes the respective sensor information of the corresponding sensor of the plurality of sensors; and means for querying the database to select sensors of the plurality of sensors based on the request responsive to a request for sensor information for sensors along a planned route.

In Example 45, the subject matter of Example 44 may include, means for creating a map of the plurality of sensors from the database; and means for selecting the sensors from the map.

In Example 46, the subject matter of any one of Examples 43 to 44 may include, wherein the registration message includes at least one of a sensor type, a data type, a location, an orientation, a range, an application program interface, or a query interface.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device to enable dynamic sensor discovery comprising:
   an autonomous device including a transceiver, the autonomous device capable of navigating from a current location to a destination location using sensor data;
   a server communication interface to control the transceiver to provide a request for sensor information for sensors along a planned route and to receive respective sensor information for each of a set of selected sensors selected by a data server based on the request, the set of selected sensors including only those that the device is authorized to access;
   a sensor communication interface to control the transceiver to subscribe to a data feed of a sensor of the set of selected sensors along the planned route based on sensor information corresponding to the sensor; and
   an obstacle avoidance interface to analyze the data feed to determine whether to proceed with the planned route.

2. The device of claim 1, wherein the request further includes a desired sensor type, wherein the set of selected sensors selected by the data server is further based on the desired sensor type.

3. The device of claim 1, wherein, responsive to detection of an obstacle by the obstacle avoidance interface, the server communication interface controls the transceiver to provide a second request for sensor information for sensors along a second planned route and receives respective sensor information for each of a second set of selected sensors selected by the data server based on the second request.

4. The device of claim 1, wherein the sensor information liar the sensor of the set of selected sensors includes at least one of an application program interface or a query interface.

5. The device of claim 1, wherein at least one of the set of selected sensors is outside a detection range of the autonomous device.

6. A system to enable dynamic sensor discovery comprising:
   a device interface controlling a transceiver to receive a request for the sensor information for sensors along a planned route from a device that includes an autonomous device that is capable of navigating from a current location to a destination location using sensor data, the device interface controlling the transceiver further to provide sensor information for each of a set of selected sensors to a client; and
   a sensor selection module to select the set of selected sensors of a plurality of sensors along the planned route responsive to the request, and to withhold sensor information for a sensor of the plurality of sensors to which the client is restricted from accessing based on whether the client is authorized to obtain data from the sensor of the plurality of sensors.

7. The system of claim 6, wherein the request further includes a desired sensor type, wherein the sensor selection module selects the set of sensors of the plurality of sensors along the planned route based on the desired sensor type.

8. The system of claim 6, wherein the device interface controlling the transceiver receives a second request for sensor information for sensors along a second planned route and provides the sensor information for each of a second set of selected sensors to the client, wherein the sensor selection module selects a second set of selected sensors of the plurality of sensors along the second planned route responsive to the second request.

9. The system of claim 6, further comprising a sensor communication interface controlling the transceiver to receive the sensor information from each of the plurality of sensors, wherein the sensor information includes at least one of a location, an orientation, or a range.

10. The system of claim 9, wherein the sensor information or the sensor of the plurality of sensors includes a sensor type and a data type.

11. The system of claim 9, wherein the sensor information from the sensor of the plurality of sensors includes an application program interface or a query interface.

12. The system of claim 6, wherein the sensor selection module constricted a map of the plurality of sensors from the database and selects the set of selected sensors based on locations on the map of the plurality of sensors.

13. The system of claim 6, wherein the sensor selection module maintains a list of available channels for a sensor of the plurality of sensors.

14. A non-transitory machine-readable medium including instructions that, when executed on a machine cause the machine to perform operations including:
   receive a request for sensor information for sensors along a planned route from a client, wherein the client includes an autonomous device capable of navigating an environment without human input;
   select sensors of a plurality of sensors along the planned route, withholding sensor information for a sensor of the plurality of sensors to which the client is restricted from accessing based on whether the client is authorized to obtain data from the sensor of the plurality of sensors; and provide sensor information for the selected sensors to the client.

15. The machine-readable medium of claim 14, including instructions that, when executed on the machine, cause the machine to perform operations including querying a database to determine which of the plurality of sensors are along the planned route.

16. The machine-readable medium of claim 14, including instructions that, when executed on the machine, cause the machine to perform operations including providing a data feed of a sensor of the selected sensors to the client.

17. The machine-readable medium of claim 14, including instructions that, when executed on the machine, cause the machine to perform operations including allocating a channel of a data feed from a sensor of the selected sensors to the client.

18. The machine-readable medium of claim 14, including instructions that, when executed on the machine, cause the machine to perform operations including:
receiving a registration message from a sensor of the plurality of sensors, the registration message including respective sensor information for the sensor; and
creating an entry in the database for the sensor, the entry including the sensor information.

19. A method, comprising:
receiving a registration message from each of a plurality sensors, the registration message ng respective sensor information;
creating a respective entry in a database for each of the plurality of sensors, each respective entry in the database includes the respective sensor information of the corresponding sensor of the plurality of sensors; and
responsive to a request for sensor information for sensors along a planned route, querying the database to select sensors of the plurality of sensors based on the request, restricting access to a sensor of the plurality of sensors that has no available channels.

20. The method of claim 19, further comprising:
creating a map of the plurality of sensors from the database; and
selecting the sensors from the map.

21. The method of claim 19, wherein the registration message includes at least one of a sensor type, a data type, a location, an orientation, a range, an application program interface, or a query interface.

* * * * *

UNITED STATES PATENT AND TRADEMARK OFFICE
CERTIFICATE OF CORRECTION

PATENT NO.        : 9,817,403 B2
APPLICATION NO.   : 15/087313
DATED             : November 14, 2017
INVENTOR(S)       : Kohlenberg et al.

It is certified that error appears in the above-identified patent and that said Letters Patent is hereby corrected as shown below:

In the Claims

Column 16, Line 2, Claim 4, delete "liar" and insert --for-- therefor

Column 16, Line 43, Claim 10, delete "or" and insert --from-- therefor

Column 16, Line 49, Claim 12, delete "constricted" and insert --constructed-- therefor Column 18, Line 2, Claim 19, after "plurality", insert --of--

Column 18, Line 3, Claim 19, delete "ng" and insert --including-- therefor

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*